US010328797B2

(12) United States Patent
Yoshida

(10) Patent No.: US 10,328,797 B2
(45) Date of Patent: Jun. 25, 2019

(54) HYDRAULIC CONTROL DEVICE FOR DRIVE POWER DISTRIBUTION DEVICE

(71) Applicant: HONDA MOTOR CO., LTD., Tokyo (JP)

(72) Inventor: Yuma Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 15/550,431

(22) PCT Filed: Feb. 16, 2016

(86) PCT No.: PCT/JP2016/054431
§ 371 (c)(1),
(2) Date: Aug. 11, 2017

(87) PCT Pub. No.: WO2016/133084
PCT Pub. Date: Aug. 25, 2016

(65) Prior Publication Data
US 2018/0029472 A1 Feb. 1, 2018

(30) Foreign Application Priority Data
Feb. 17, 2015 (JP) ................. 2015-028619

(51) Int. Cl.
B60K 17/35 (2006.01)
B60K 6/387 (2007.10)
(Continued)

(52) U.S. Cl.
CPC .............. B60K 17/35 (2013.01); B60K 6/387 (2013.01); B60K 23/0808 (2013.01);
(Continued)

(58) Field of Classification Search
CPC .... B60K 17/35; B60K 6/387; B60K 23/0808; B60K 2023/0833; B60K 2023/0866;
(Continued)

(56) References Cited

U.S. PATENT DOCUMENTS 5,823,912 A * 10/1998 Fischer ................. F16D 25/123
477/97
5,839,084 A * 11/1998 Takasaki ................ B60K 17/35
701/67
(Continued)

FOREIGN PATENT DOCUMENTS

JP 01-122728 A 5/1989
JP 2-300523 A 12/1990
(Continued)

OTHER PUBLICATIONS

Notice of Reasons for Rejection dated Jul. 30, 2018, issued in counterpart Canadian application No. 2,976,324. (3 pages).
(Continued)

Primary Examiner — Jacob S. Scott
Assistant Examiner — Tinh T Dang
(74) Attorney, Agent, or Firm — Westerman, Hattori, Daniels & Adrian, LLP

(57) ABSTRACT

To provide a device to facilitate protection of a clutch while minimizing degradation of the torque transmission performance. A hydraulic clutch for drive power distribution is provided between a drive power source and auxiliary driving wheels, and a commanded torque is determined depending on the travel situation. The hydraulic pressure corresponding to the commanded torque is supplied to the hydraulic clutch. The surface temperature of the clutch is estimated (detected). The device generates a limiting value to limit the commanded torque when the difference in rotation between input and output shafts of the clutch is not less than a
(Continued)

predetermined threshold and the commanded torque is not less than a predetermined value and performs control so as to increase the limiting value with an increase in the surface temperature of the clutch.

2 Claims, 4 Drawing Sheets

(51) Int. Cl.
| | | |
|---|---|---|
| B60K 23/08 | (2006.01) | |
| B60L 15/20 | (2006.01) | |
| B60W 10/119 | (2012.01) | |
| B60W 30/184 | (2012.01) | |
| F16D 48/02 | (2006.01) | |
| F16D 48/06 | (2006.01) | |

(52) U.S. Cl.
CPC ........ *B60L 15/2054* (2013.01); *B60W 10/119* (2013.01); *B60W 30/1843* (2013.01); *F16D 48/02* (2013.01); *F16D 48/066* (2013.01); B60K 2023/0833 (2013.01); B60K 2023/0866 (2013.01); B60W 2510/0291 (2013.01); B60W 2720/403 (2013.01); F16D 2048/0293 (2013.01); F16D 2500/10425 (2013.01); F16D 2500/10431 (2013.01); F16D 2500/30405 (2013.01); F16D 2500/30415 (2013.01); F16D 2500/30426 (2013.01); F16D 2500/30816 (2013.01); F16D 2500/30825 (2013.01); F16D 2500/3108 (2013.01); F16D 2500/5106 (2013.01); F16D 2500/70408 (2013.01); Y02T 10/645 (2013.01); Y02T 10/72 (2013.01); Y02T 10/7275 (2013.01)

(58) Field of Classification Search
CPC ............. B60L 15/2054; B60W 10/119; B60W 30/1843; B60W 2510/0291; B60W 2720/403; F16D 48/02; F16D 48/066; F16D 2048/0293; F16D 2500/10425; F16D 2500/10431; F16D 2500/30405; F16D 2500/30415; F16D 2500/30426; F16D 2500/30816; F16D 2500/30825; F16D 2500/3108; F16D 2500/5106; F16D 2500/70408

See application file for complete search history.

(56) References Cited

U.S. PATENT DOCUMENTS

| | | | | |
|---|---|---|---|---|
| 6,745,885 | B2 * | 6/2004 | Murakami | ......... B60K 23/0808 |
| | | | | 180/249 |
| 8,405,497 | B2 * | 3/2013 | Okabe | ................... F16D 48/066 |
| | | | | 192/30 W |
| 9,020,723 | B2 * | 4/2015 | Shigeta | .................. B60K 17/35 |
| | | | | 701/69 |
| 9,239,066 | B2 | 1/2016 | Sugo et al. | |
| 9,400,020 | B2 * | 7/2016 | Morimoto | ............... F16D 48/06 |
| 9,561,720 | B2 * | 2/2017 | Sarai | .................. B60K 23/0808 |

FOREIGN PATENT DOCUMENTS

| | | |
|---|---|---|
| JP | 10-331866 A | 12/1998 |
| JP | H10-331866 A | 12/1998 |
| JP | 2001-206092 A | 7/2001 |
| JP | 2002-340054 A | 11/2002 |
| JP | 2004-19768 A | 1/2004 |
| JP | 2007-038900 A | 2/2007 |
| JP | 2010-149649 A | 7/2010 |
| JP | 5607240 B2 | 10/2014 |

OTHER PUBLICATIONS

Translation of Written Opinion dated May 17, 2016 issued in counterpart application No. PCT/JP2016/054431. (4 pages).
Office Action dated Dec. 12, 2017, issued in counterpart Japanese Application No. 2017-500685, with English translation (6 pages).
Office Action dated Sep. 5, 2018, issued in counterpart Chinese Application No. 201680010148.0, with English translation (8 pages).
Search Report dated Sep. 5, 2018, issued in counterpart Chinese Application No. 201680010148.0, with English translation (6 pages).
International Search Report dated May 17, 2016, issued in counterpart application No. PCT/JP2016/054431. (1 page).
Notice of Reasons for Rejection dated Jul. 11, 2017, issued in counterpart Japanese Patent Application No. 2017-500685, w/English translation (6 pages).

* cited by examiner

HYDRAULIC CONTROL DEVICE FOR DRIVE POWER DISTRIBUTION DEVICE

FIELD OF INVENTION

The present invention relates to a hydraulic control device which controls hydraulic pressure used to generate engagement pressure for a hydraulically-driven multiple-disc friction-type connector/disconnector (a hydraulic clutch) included in a drive power distribution device of a four-wheel-drive vehicle. The drive power distribution device distributes drive power from a drive power source to first driving wheels (main driving wheels) and second driving wheels (auxiliary driving wheels).

BACKGROUND ART

Some conventional four-wheel-drive vehicles include a drive power distribution device for distributing drive power generated by a drive power source, such as an engine, to main driving wheels and auxiliary driving wheels. In this kind of four-wheel-drive vehicles, when the front wheels are main driving wheels while the rear wheels are auxiliary driving wheels, for example, the drive power generated at the drive power source is transmitted to the front wheels through a front drive shaft and a front differential while being transmitted to a drive power distribution device including a multiple disc clutch through a propeller shaft. Hydraulic fluid is then supplied at a predetermined pressure from a hydraulic control device to the drive power distribution device to control the engagement pressure of the drive power distribution device. A predetermined proportion of the drive power from the drive power source is thereby transmitted to the rear wheels.

Examples of the hydraulic control device configured to control the hydraulic pressure supplied to the multiple disc clutch of the drive power distribution device include hydraulic control devices shown in Patent Literatures 1 and 2. Each of the hydraulic control devices shown in Patent Literatures 1 and 2 includes an electric oil pump supplying hydraulic fluid to a hydraulic chamber that presses the multiple disc clutch. The electric oil pump and hydraulic chamber are connected with a hydraulic pressure supply path. The hydraulic control device controls the revolutions of the electric pump so that the discharge value of the electric pump is equal to the required hydraulic pressure for the hydraulic clutch. The hydraulic control device described in Patent Literature 2 controls motor drive of the electric pump so as to generate hydraulic pressure according to the distribution ratio of drive power. The hydraulic control devices of Patent Literatures 1 and 2 are configured to supply hydraulic pressure necessary for the hydraulic clutch by driving the electric pump. The electric oil pump therefore needs to be always operated while the hydraulic clutch is engaged. Accordingly, it is difficult to guarantee the durability of the motor (brush wear) when the motor to drive the electric oil pump is a brushed motor.

In this light, Patent Literature 3 proposes a hydraulic pressure sealed-type hydraulic control device using a motor and a solenoid valve. In this hydraulic pressure sealed-type hydraulic control device, the hydraulic pressure path to supply hydraulic fluid from an oil pump driven by the motor to a piston chamber of a clutch for distributing drive power is provided with a hydraulic fluid sealing valve to seal hydraulic fluid and a solenoid valve (an on-off valve) to open and close the fluid path between the hydraulic fluid sealing valve and piston chamber. In order to pressurize the piston chamber, the hydraulic pressure sealed-type hydraulic control device closes the solenoid valve and drives the oil pump with the motor in a stepwise manner to perform control so that the pressure in the piston chamber become commanded hydraulic pressure. In order to depressurize the piston chamber, the hydraulic pressure sealed-type hydraulic control device disables drive of the oil pump and opens and closes the solenoid valve in a stepwise manner to perform control so that the pressure of the piston chamber becomes the commanded hydraulic pressure. In such a manner, the motor is driven only to pressurize the piston chamber and is not driven to depressurize the piston chamber. This can reduce the frequency of use of the motor, improving the durability.

CITATION LIST

Patent Literature

[Patent Literature 1] Japanese Patent Laid-open Publication No. 2004-19768
[Patent Literature 2] Japanese Patent Laid-open Publication No. 2001-206092
[Patent Literature 3] Japanese Patent Publication No. 5607240

Every type of hydraulic control devices performs control in such a manner that, for the purpose of protecting a clutch, when the difference in rotational speed between input and output shafts of the clutch exceeds a predetermined allowable value, the value of the commanded torque for the clutch is limited to a predetermined limiting value in order to limit the requirement for excessive torque. In such a case, the limiting value for the commanded torque is normally set to a value lower than the mechanistic limit value of the hydraulic system taking into consideration of mechanistic variations. Moreover, in such a case, the surface temperature of the clutch often increases. This could contribute to such a vicious circle that the increase in temperature reduces the transmitted torque by the clutch and the driving torque to the auxiliary driving wheels decreases more than necessary.

SUMMARY OF INVENTION

The present invention was made in the light of the aforementioned points. An object of the present invention is to provide a hydraulic control device capable of protecting the clutch while minimizing the degradation in torque transmission performance.

The present invention is a hydraulic control device for a drive power distribution device of a vehicle, the vehicle including: a drive power transmission path to transmit drive power from a drive power source to a first driving wheel and a second driving wheel; a drive power distribution device including a hydraulically-driven multiple disc friction-type connector/disconnector provided between the drive power source and the second driving wheel in the drive power transmission path; and a temperature acquisition unit configured to acquire surface temperature of multiple discs of the connector/disconnector, the hydraulic control device including: a controller which acquires a required drive power transmission amount for the drive power distribution device and performs control to supply hydraulic pressure corresponding to the required drive power transmission amount to the connector/disconnector. When the difference in rotation between the drive power source's side and the second driving wheel's side with respect to the connector/disconnector in the drive power transmission path is not less than a predetermined first threshold and the required drive power transmission amount is not less than a predetermined second threshold, the controller performs control so that the required drive power transmission amount is limited to a predetermined limiting value or less and so that the limiting value increases with an increase in the surface temperature of the multiple discs.

According to the present invention, control is performed so as to increase the limiting value with an increase in the surface temperature of the multiple discs (clutch) of the connector/disconnector in the case where the required drive power transmission amount needs to be limited to a predetermined limiting value (limiting torque value) for the purpose of protecting the connector/disconnector (clutch) when the difference in rotation between the drive power source's side and the second driving wheel's side with respect to the connector/disconnector (the difference in rotation between the input and output shafts of the clutch as the connector/disconnector, for example) in the drive power transmission path reaches a predetermined threshold or more. Accordingly, the decrease in the transmission amount (torque) by the connector/disconnector (clutch) due to an increase in temperature can be compensated by increasing the limiting value. The drive power distribution device of the present invention therefore provides an excellent effect of facilitating protection of the connector/disconnector (clutch) while minimizing the degradation in torque transmission performance of the connector/disconnector (clutch).

MODES FOR CARRYING OUT THE PRESENT INVENTION

Figure 1:
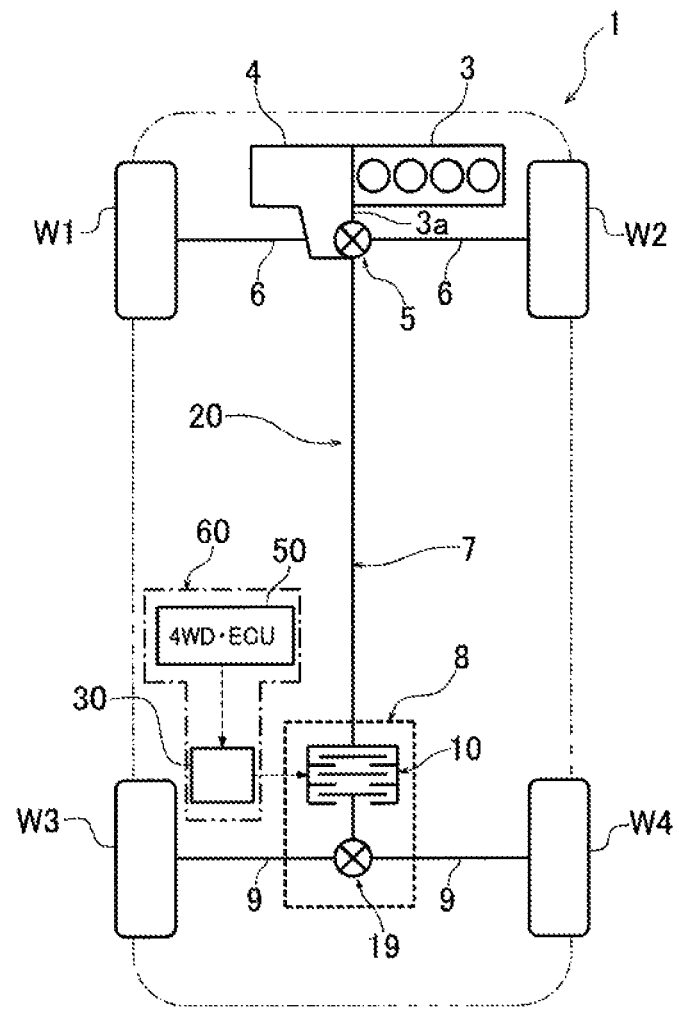
FIG. 1 is a diagram illustrating a schematic configuration of a four-wheel-drive vehicle including a hydraulic control device for a drive power distribution device according to an embodiment of the present invention.

FIG. 1 is a diagram illustrating a schematic configuration of a four-wheel-drive vehicle including a hydraulic control device for a drive power distribution device according to an embodiment of the present invention. A four-wheel-drive vehicle 1 illustrated in FIG. 1 includes: an engine (a drive source) 3 placed transversely in the front of the vehicle; an automatic transmission 4 integrally installed with the engine 3; and a drive power transmission path 20 configured to transmit drive power from the engine 3 to front wheels W1 and W1 and rear wheels W3 and W4.

The output shaft (not illustrated) of the engine 3 is coupled to the left and right front wheels W1 and W2 as main driving wheels (first driving wheels) through a front differential (hereinafter, referred to as a "front diff") 5 and left and right front drive shafts 6 and 6. The output shaft of the engine 3 is further coupled to the left and right rear wheels W3 and W4 as auxiliary driving wheels (second driving wheels) through the automatic transmission 4, the front diff 5, the propeller shaft 7, a rear differential unit (hereinafter, referred to as a "rear diff unit") 8, and left and right rear drive shafts 9 and 9.

The rear diff unit 8 includes: a rear differential (hereinafter, referred to as a "rear diff") 19 to distribute drive power to the left and right rear drive shafts 9 and 9; and a front and rear torque distribution clutch 10 to connect and disconnect the drive power transmission path from the propeller shaft 7 to the rear diff 19. The front and rear torque distribution clutch (that is, a hydraulically-driven multiple disc friction-type connector/disconnector) 10 is a hydraulic clutch and is a drive power distribution device to control drive power to be distributed to the rear wheels (second driving wheels) W3 and W4 in the drive power transmission path 20. The four-wheel-drive vehicle 1 further includes: a hydraulic circuit 30 to supply hydraulic fluid to the front and rear torque distribution clutch 10; and a 4WD•ECU (hereinafter, just referred to as an ECU) 50 as a controller to control the hydraulic pressure to be supplied by the hydraulic circuit 30. The ECU 50 is composed of a microcomputer and the like.

The ECU 50 controls the hydraulic pressure supplied by the hydraulic circuit 30 to control drive power to be distributed to the rear wheels W3 and W4 through the front and rear torque distribution clutch (hereinafter, just referred to as a clutch) 10. Drive control is thereby performed with the front wheels W1 and W2 as the main driving wheels and the rear wheels W3 and W4 as the auxiliary driving wheels.

When the clutch 10 is released (disconnected), rotation of the propeller shaft 7 is not transmitted to the rear diff 19 side, and all the torque of the engine 3 is transmitted to the front wheels W1 and W2, so that the four-wheel-drive vehicle 1 is in the front-wheel drive (2WD) mode. On the other hand, when the clutch 10 is connected, rotation of the propeller shaft 7 is transmitted to the rear diff 19 side, and the torque of the engine 3 is distributed to both of the front wheels W1 and W2 and the rear wheels W3 and W4, so that the four-wheel-drive vehicle 1 is in the four-wheel-drive (4WD) mode. The ECU 50 calculates the drive power to be distributed to the rear wheels W3 and W4 and the supply of hydraulic pressure to the clutch 10 corresponding to the calculated drive power based on detection by various detectors (not illustrated) configured to detect vehicle's travel state. The ECU 50 also outputs a drive signal based on the calculation result to the clutch 10. The ECU 50 thus controls the fastening drive power in the clutch 10 to control the drive power to be distributed to the rear wheels W3 and W4.

Figure 2:
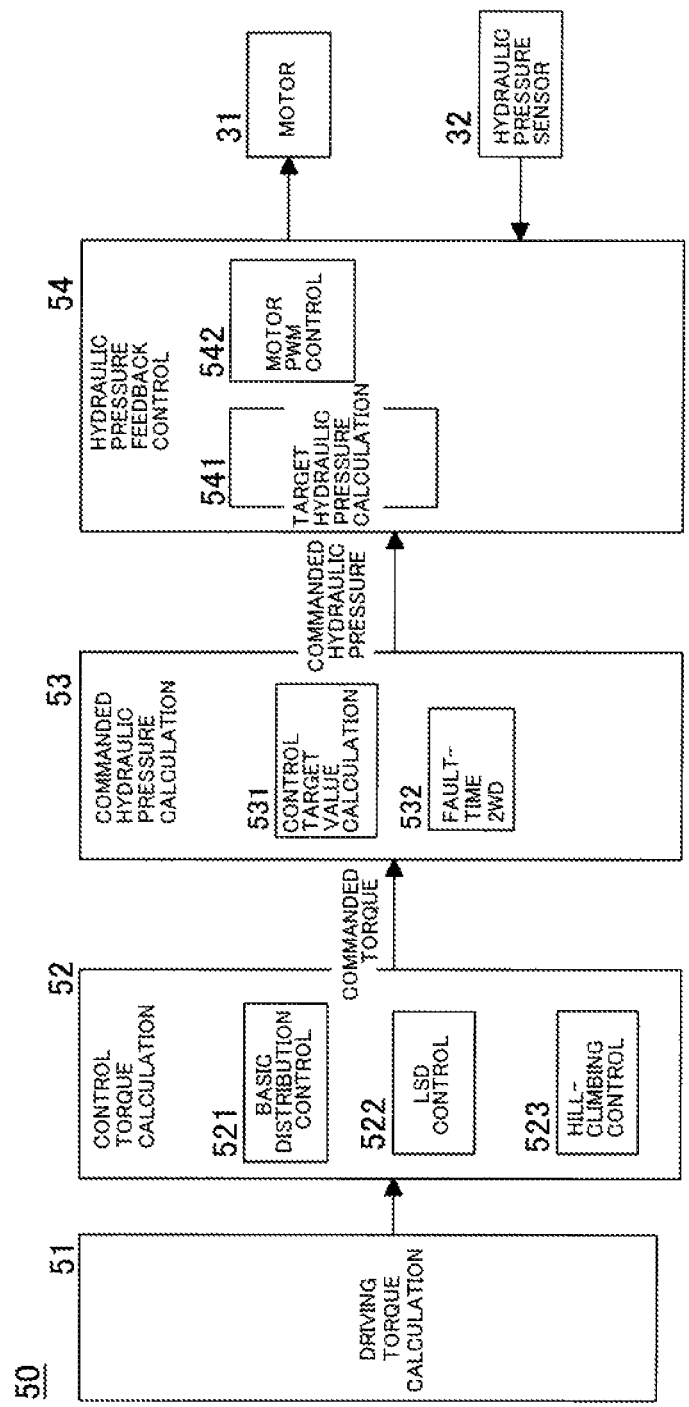
FIG. 2 is a diagram illustrating main functional blocks of a 4WD•ECU functioning as the hydraulic control device.

FIG. 2 illustrates main functional blocks of the 4WD•ECU (controller) 50. A driving torque calculation block 51 calculates driving torque (estimation drive power) required for the vehicle 1 according to the travel conditions (the torque of the engine 3, the selected gear, the shift position, and the like) of the vehicle 1. A control torque calculation block 52 determines the distribution of driving torque to be distributed to the front and rear wheels according to various control factors with a basic distribution control (basic distribution control for drive power to the front wheels W1 and W2 and rear wheels W3 and W4) block 521, an LSD control block 522, a hill-climbing control block 523, and the like and calculates commanded torque (required drive power transmission amount) for the front and rear torque distribution clutch (drive power distribution device) 10. A commanded hydraulic pressure calculation block 53 calculates commanded hydraulic pressure for the clutch 10 based on the commanded torque (required drive power transmission amount). Specifically, a control target value calculation block 531 calculates a control target value (that is, the above-described commanded hydraulic pressure) for the clutch 10 based on the commanded torque, and a fault-time 2WD block 532 calculates a control target value (that is, the above-described commanded hydraulic pressure) to switch to the 2WD mode in the event of a fault. In normal times, the control target value calculated by the control target value calculation block 531 is outputted as the commanded hydraulic pressure. In the event of a fault, the control target value calculated by the fault-time 2WD block 532 is outputted as the commanded hydraulic pressure. A hydraulic pressure feedback control block 54 uses a target hydraulic pressure calculation block 541 to calculate the target hydraulic pressure (that is, hydraulic pressure deviation) of the clutch 10 according to the deviation between the commanded hydraulic pressure given by the commanded hydraulic pressure calculation block 53 and actual hydraulic pressure (feedback signal from the hydraulic pressure sensor 32) and uses a motor PWM control block 542 to control the motor 31 based on the calculated target hydraulic pressure (that is, hydraulic pressure deviation). The motor 31 is an electric motor to drive a hydraulic pump (not illustrated) configured to supply hydraulic fluid pressure to the clutch 10. The fluid pressure sensor 32 measures the hydraulic pressure supplied to the clutch 10. The motor PWM control block 542 generates a PWM drive instruction signal for the motor 31 based on the target hydraulic pressure (that is, hydraulic pressure deviation). In such a manner, hydraulic pressure feedback control is performed so that the actual hydraulic pressure follows the commanded hydraulic pressure. As shown in Patent Literature 3 (Japanese Patent Publication No. 5607240) described above, the hydraulic circuit to supply hydraulic pressure to the clutch 10 may be provided with a solenoid valve (on/off valve). The solenoid valve (on/off valve) is opened or closed according to the need for hydraulic pressure sealed control (control of intermittently driving the motor 31 with the solenoid valve closed for pressurization and intermittently opening the solenoid value with the motor 31 stopped for depressurization). This configuration can reduce the frequency of use of the motor 31.

Figure 3:
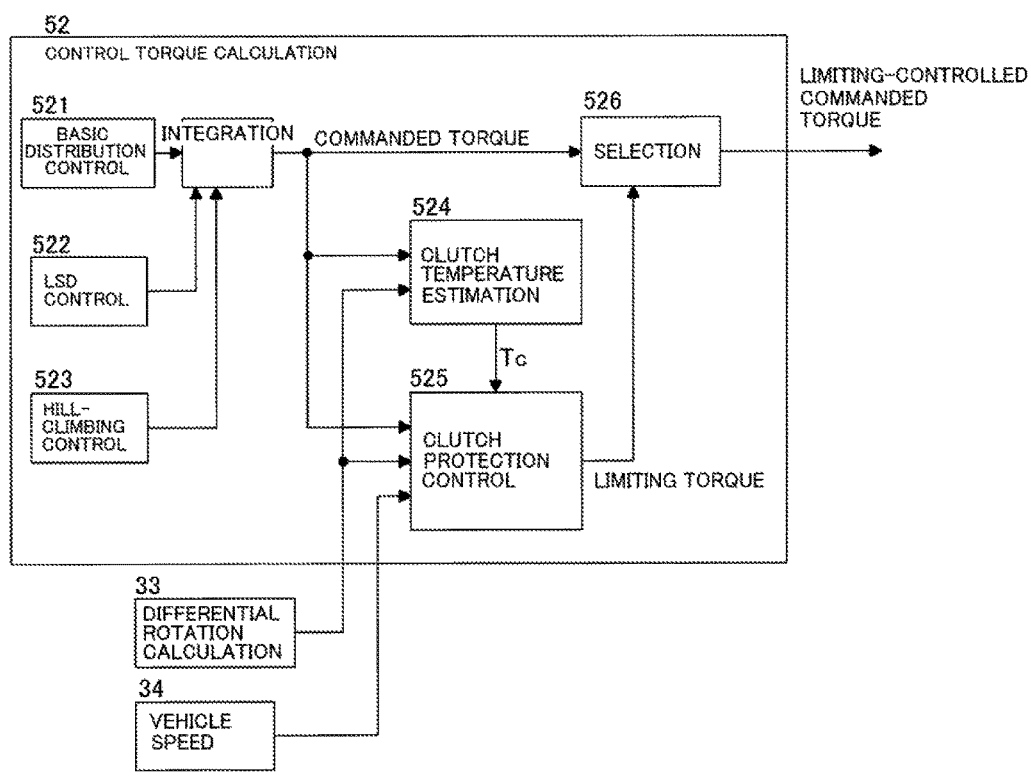
FIG. 3 is a diagram of control blocks relating the present invention.

FIG. 3 is a diagram illustrating control elements related to the present invention included in the control torque calculation block 52 illustrated in FIG. 2. A differential rotation calculator 33 calculates the difference in rotation between input and output shafts of the clutch 10 (or may be configured to calculate the difference in rotation between the front wheels W1 and W2 and the rear wheels W3 and W4. The differential rotation calculator 33 needs to be configured to acquire the difference in rotation between the drive power source's side and the second driving wheels' side with respect to the connector/disconnector (clutch 10) in the drive power transmission path). A vehicle speed detector 34 detects vehicle speed of the vehicle 1. A clutch temperature estimation block 524 performs arithmetic operation to estimate (detect) surface temperature Tc of the friction engagement materials (multiple discs) of the clutch 10 according to a publicly-known clutch absorption energy calculation formula based on the commanded torque calculated by the control torque calculation block 52 (typically the sum of commanded torques calculated in the basic distribution control block 521, the LSD control block 522, the hill-climbing control block 523, and the like), the difference in rotation calculated by the differential rotation calculator 33, and the like.

A clutch protection control block 525 generates a limiting torque value (that is, a limiting value) to protect the clutch 10. When the difference in rotation between the input and output shafts of the clutch 10 exceeds a predetermined allowable value (a first threshold), the limiting torque value is generated to limit the value of the commanded torque (required drive power transmission amount) for the clutch 10 to a predetermined value in order to prevent requirement for excessive torque. Basically, the clutch protection control block 525 generates a predetermined limiting torque value (a limiting value) when the following basic conditions are satisfied: the vehicle speed is not lower than a predetermined speed; the difference in rotation is greater than the predetermined allowable value (first threshold); and the commanded torque (required drive power transmission amount) is not less than a predetermined value (a second threshold). Although such limiting torque is conventionally generated, the conventionally generated torque has a constant value. According to the present invention, the clutch protection control block 525 further takes into consideration the surface temperature Tc of the clutch 10 and is configured to increase the limiting torque value (limiting value) with an increase in the surface temperature Tc. To be specific, the clutch protection control block 525 is configured to calculate a variable limiting value so that the limiting value varies according to characteristics opposite to variation in produced torque. The variation in generated torque is predicted based on fluctuations in clutch surface temperature according to theoretical characteristics of the generated torque varying on the clutch surface temperature and differential rotation as the parameters. The variable limiting value (the upper limit of the limiting torque value is equal to a prescribed torque (a third threshold) corresponding to limit hydraulic pressure determined by the mechanistic characteristics of the hydraulic system including the clutch 10 (the prescribed torque is larger than the predetermined value (second threshold)). This is to protect the clutch 10 and the like. Basically, as the clutch surface temperature increases, the transmitted torque decreases, and the theoretical value of the produced torque relatively decreases. The aforementioned calculated variable limiting torque value therefore relatively increases. In such a manner, the limiting torque value (limiting value) outputted from the clutch protection control block 525 is not fixed to a constant value and is properly increased with an increase in the surface temperature Tc of the clutch 10. A selection block 526 limits the commanded torque (required drive power transmission amount) calculated by the basic distribution control block 521 and the like so that the commanded torque is not greater than the limiting value (the variable limiting value according to the clutch surface temperature Tc) generated by the clutch protection control block 525 (that is, so that the required drive power transmission amount is controlled so as to be limited to the limiting value or less). Specifically, the selection block 526 selects and outputs the commanded torque calculated by the basic distribution control block 521, LSD control block 522, hill-climbing control block 523, and the like (the sum thereof). When the commanded torque (required drive power transmission amount) is greater than the limiting torque value (the variable limiting value depending on the clutch surface temperature Tc), the selection block 526 selects and outputs the limiting value (this means that the required drive power transmission amount greater than the limiting value is limited to the limiting value while the required drive power transmission amount originally smaller than the limiting value is directly outputted). The selection block 526 thereby outputs the commanded torque already subjected to the limiting control. The limiting-controlled commanded torque value is given to the commanded hydraulic pressure calculation block 53 (FIG. 2).

Figure 4:
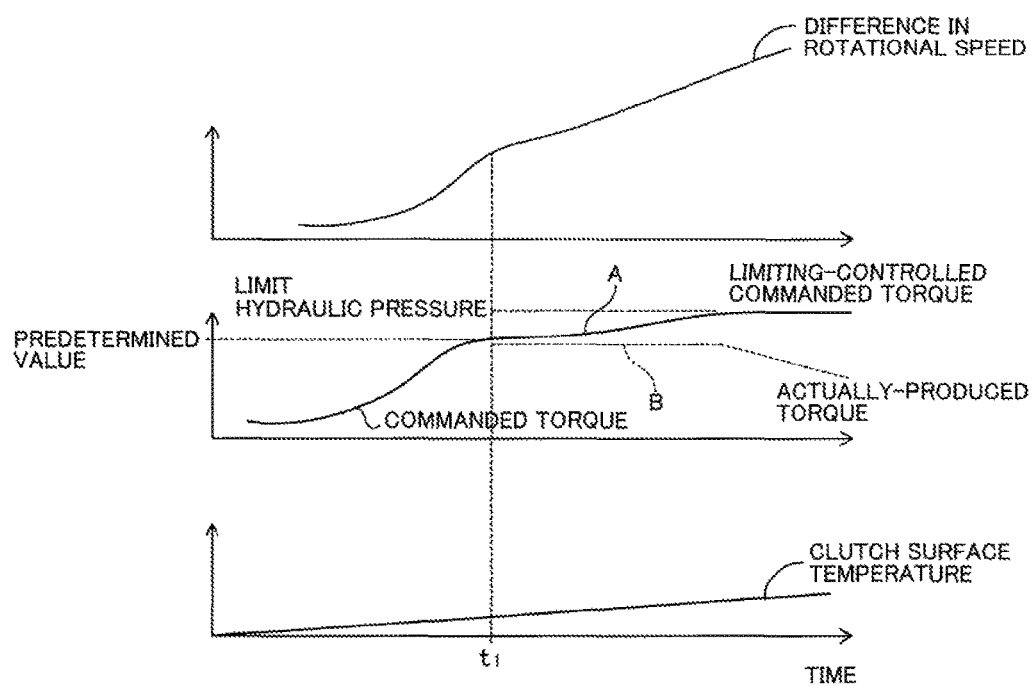
FIG. 4 is a time chart illustrating an operation example according to the present invention.

FIG. 4 is a time chart illustrating an operation example of the control blocks illustrated in FIG. 3. The upper part illustrates an example of changes with time in difference in rotational speed between input and output shafts of the clutch 10, and the middle part illustrates an example of changes with time in commanded torque (limiting-controlled commanded torque). The lower part illustrates an example of changes with time in the surface temperature Tc of the clutch 10. For example, it is assumed that the difference in rotational speed exceeds a predetermined threshold before time $t_1$ and the commanded torque increases to the predetermined value or higher at the time $t_1$. In this case, the commanded torque given from the control torque calculation block 52 to the commanded hydraulic pressure calculation block 53 is a not-limited normal commanded torque by the time $t_1$. After the time $t_1$, the commanded torque is the limiting-controlled commanded torque according to the limiting torque value (limiting value) generated from the clutch protection control block 525. In FIG. 4, symbol A indicates the limiting-controlled commanded torque. The limiting-controlled commanded torque A is not constant and properly increases with an increase in the clutch surface temperature Tc. The upper limit of the limiting-controlled commanded torque A is set equal to a torque (the aforementioned prescribed torque) corresponding to the limit hydraulic pressure determined from the mechanistic characteristics of the hydraulic system. In FIG. 4, the dashed curve indicated by symbol B shows an example of torque actually produced in the clutch 10 hydraulically controlled based on the commanded hydraulic pressure according to the limiting-controlled commanded torque A. As shown in the chart, even if the commanded torque A is increased, the actually produced torque does not increase substantially because of the loss of transmitted torque due to the increase in the clutch surface temperature Tc. However, the generated torque can be maintained at a comparatively high level. According to the present invention, it is possible to facilitate protection of the clutch while minimizing the degradation in the torque transmission performance. On the contrary, if the limiting torque is maintained at a constant value like the conventional manner, actually-produced torque obviously decreases gradually due to a loss in the transmitted torque due to an increase in the clutch surface temperature, resulting in a low torque transmission efficiency.

The invention claimed is:

1. A hydraulic control device for a drive power distribution device of a vehicle, the vehicle including:

a drive power transmission path to transmit drive power from a drive power source to a first driving wheel and a second driving wheel;

a drive power distribution device including a hydraulically-driven multiple disc friction-type connector/disconnector provided between the drive power source and the second driving wheel in the drive power transmission path; and a temperature acquisition unit configured to acquire surface temperature of multiple discs of the connector/disconnector, the hydraulic control device comprising:

a controller which acquires a required drive power transmission amount for the drive power distribution device and performs control to supply hydraulic pressure corresponding to the required drive power transmission amount to the connector/disconnector, wherein when the difference in rotation between the drive power source's side and the second driving wheel's side with respect to the connector/disconnector in the drive power transmission path is not less than a predetermined first threshold and the required drive power transmission amount is not less than a predetermined second threshold, the controller performs control so that the required drive power transmission amount is limited to a predetermined limiting value or less and so that the limiting value increases with an increase in the surface temperature of the multiple discs.

2. The hydraulic control device of a drive power distribution device according to claim 1, wherein when the limiting value increases to a predetermined third threshold or higher, the controller performs control to stop the increase in the limiting value.

\* \* \* \* \*